United States Patent
Dokko

(10) Patent No.: US 7,224,958 B2
(45) Date of Patent: May 29, 2007

(54) METHOD AND SYSTEM FOR MANAGING ACCOUNTING INFORMATION IN AN MSC

(75) Inventor: Seh Joon Dokko, Seoul (KR)

(73) Assignee: LG Electronics, Inc., Seoul (KR)

( * ) Notice: Subject to any disclaimer, the term of this patent is extended or adjusted under 35 U.S.C. 154(b) by 756 days.

(21) Appl. No.: 10/446,784

(22) Filed: May 29, 2003

(65) Prior Publication Data

US 2004/0202296 A1    Oct. 14, 2004

(30) Foreign Application Priority Data

May 31, 2002    (KR)    ................. 10-2002-0030555

(51) Int. Cl.
*H04M 11/00*    (2006.01)

(52) U.S. Cl. ................. 455/407; 455/410; 379/114.01; 379/121.01

(58) Field of Classification Search ................. 455/407, 455/405, 410; 379/114.17, 121.03, 144.06, 379/114.01, 112.09, 126
See application file for complete search history.

(56) References Cited

U.S. PATENT DOCUMENTS

| | | | |
|---|---|---|---|
| 5,454,033 A * | 9/1995 | Hahn et al. ................. 379/198 |
| 6,330,690 B1 | 12/2001 | Nouri et al. ................. 714/23 |
| 6,393,584 B1 | 5/2002 | McLaren et al. ............. 714/14 |
| 6,507,646 B1 * | 1/2003 | Fishler ................. 379/215.01 |
| 6,772,275 B1 * | 8/2004 | Beerens et al. ............. 711/103 |
| 6,778,833 B1 * | 8/2004 | Fortuna ................. 455/446 |
| 7,079,849 B2 * | 7/2006 | Hanson ................. 455/456.1 |

* cited by examiner

*Primary Examiner*—Charles Appiah
*Assistant Examiner*—Nghi H. Ly
(74) *Attorney, Agent, or Firm*—Ked & Associates LLP

(57) ABSTRACT

The present invention relates to method and system for managing accounting information in a mobile switching center (MSC) configured to prevent abnormal termination of calls in progress and loss of accounting information due to the abnormal termination of the calls, when system start-up request from operator terminal occurs due to software exchange, etc. Each subscriber call processing processor receives a call termination message from an operation and maintenance processor (OMP) and main process in the subscriber call processing processor transfers the call termination message to child processes in the subscriber call processing processor that currently process calls. The main process receives a response message for the call termination message indicating that calls are normally terminated and accounting information is generated from the child processes, generates final call termination completion response message and transfers the call termination completion response message to the OMP, thereby performing a normal system restart-up procedure.

21 Claims, 7 Drawing Sheets

METHOD AND SYSTEM FOR MANAGING ACCOUNTING INFORMATION IN AN MSC

BACKGROUND OF THE INVENTION

1. Field of the Invention

The present invention relates to method and system for managing accounting information in a mobile switching center (MSC). More particularly, the present invention relates to method and system for managing accounting information in an MSC configured to prevent abnormal termination of calls in progress and loss of accounting information due to the abnormal termination of the calls, when a system start-up request from an operator terminal occurs in an MSC, processing a lot of calls and operating the calls, due to software exchange, etc.

2. Description of the Related Art

As illustrated in FIG. 1, the mobile switching system includes subscriber call processing processors 1, trunk matching processors 2, a call process centralizing processor 3, visitor location register (VLR) processing processors 4 and an operation and maintenance processor (OMP) 5.

The subscriber call processing processor 1 and the trunk matching processor 2 are principal processors performing call processing functions and perform call connecting functions by cooperating with the call process centralizing processor 3 and the VLR processing processor 4. When the subscriber call processing processor 1 and the trunk matching processor 2 receive call termination requests for calls in progress from the OMP 5, the subscriber call processing processor 1 and the trunk matching processor 2 generate accounting information, transfer the accounting information to the OMP 5, release resources and terminate the calls.

The call process centralizing processor 3 performs common call processing functions, such as number translation, s-switch connection and disconnection, etc., regardless of subscriber call process performed by the subscriber call processing processor 1, trunk matching performed by the trunk matching processor 2, etc.

The VLR processing processor 4 requests subscriber location register information of subscribers in a certain area and the subscriber information by cooperating with a home location register (HLR) not included in a mobile switching system and temporarily stores the subscriber location register information and the subscriber information that received from the HLR.

The OMP 5 performs certain operations and maintenance in mobile switching system, system start-up/condition management, etc., receives accounting information transferred from the subscriber call processing processor 1 and the trunk matching processor 2, stores the accounting information in hard disk 6 and controls whether to extract the accounting information stored in the hard disk 6.

When operator requests restart-up of the mobile switching system for reasons of software exchange, etc., an operator terminal transfers the restart-up command to the OMP 5. The OMP 5 completes the restart-up of the OMP 5 and controls the other processors (the subscriber call processing processor 1, the trunk matching processor 2, the call process centralizing processor 3, the VLR processing processor 4, etc.) to perform restart-up of the processors themselves. For restart-up of the processors, software blocks such as processor loader (PL), system start-up loader (SSL), etc. performing restart-up of each processor exist in the processors.

The PL receives application software blocks to be operated from the hard disk 6 in turn and is loaded in the other processors except the OMP 5.

The SSL receives an application software block request from PL loaded in the other processors and is loaded in the OMP 5 by receiving the application software blocks in turn from the hard disk 6.

Hereinafter, a related art method of managing accounting information in a mobile switching center when restarting up the system will be described.

Let's assume that operator may command restart-up of the whole system in the present invention, even though operator may command both restart-up of the whole system and restart-up of certain software block.

An OMP 5 that received a restart-up command from an operator terminal generates a call termination message and commands each processor to terminate all operations in progress by transferring the call termination message to each processor. Each processor terminates all operations in progress after receiving the call termination message from the OMP 5. And, operating system performs restart-up by using a booter. When restart-up is completed, PL is loaded in each processor and, at the same time, the SSL is loaded in the OMP 5.

In other words, when the system is restarted up, PL is loaded in each processor by receiving application software blocks from the hard disk 6 in turn and SSL is loaded in the OMP 5 by receiving application software blocks from the hard disk 6 in turn.

Since the OMP 5 is directly connected to the hard disk 6 and the other processors are connected to the hard disk 6 through the OMP 5, restart-up of the system by the booter may be performed after the SSL is loaded in the OMP 5 by restart-up of the OMP 5.

In other words, when a restart-up request occurs, each processor terminates all operations in progress, tries a restart-up procedure by the booter, receives software blocks by transferring a certain message to SSL of the OMP 5 and loads PL in each processor.

Mobile switching system continuously proceeds with a lot of call outgoing/incoming trials, allotment and release of resources for supporting call connection states, request/response/renewal of related information, etc.

If restart-up command due to the necessity of software exchange is inputted from the operator during the continuous operations of the mobile switching system, the mobile switching system instantly shifts to an initial state with disregarding state of call process in progress. Accordingly, currently progressed calls in various states are abnormally completed and resources are lost.

There is a problem in that all records about calls are lost by the abnormal termination, though the records are important information, not only bases of accounting information for carrier's profit but also bases of civil appeals.

SUMMARY OF THE INVENTION

The present invention is to solve the above-described problems and an object of the present invention is to prevent an abnormal termination of calls in progress due to software exchange and accounting information loss due to the abnormal termination by stably restarting up the system. To achieve the object of the present invention, the present invention provides method and system for managing accounting information in a mobile switching center that appropriately releases resources through normal termination, generates and records accounting information and shifts to an idle state in order not to process additional call outgoing/incoming requests In order to achieve the above objects, in whole or in parts, there is provided a system for managing accounting information in a mobile switching center (MSC) including: an operation and maintenance processor (OMP) for terminating calls in progress normally by controlling each subscriber call processing processor when receiving a system restart-up command and performing system restart-up procedure when receiving a call termination completion response message; and a number of subscriber call processing processors for preventing additional call processes, terminating calls in progress normally and reporting processing result of the calls to the OMP, by control of the OMP.

Preferably, the subscriber call processing processor of the system for managing accounting information in an MSC shifts to the wait state after receiving a call termination message.

Preferably, the subscriber call processing processor of the system for managing accounting information in an MSC generates the call termination completion response message, determines transferring point of the call termination completion response message and reports the processing result of the calls.

Preferably, the termination completion response message of the system for managing accounting information in an MSC includes information indicating that no call is in progress in the subscriber call processing processor.

Preferably, the termination completion response message of the system for managing accounting information in an MSC includes information indicating that a certain accounting information management procedure is performed by processes that currently process calls.

Preferably, the transferring point of the call termination completion response message at the system for managing accounting information in an MSC is the time when a certain waiting time, measured from the time when the main process in the subscriber call processing processor receives the call termination message, passes.

Preferably, the main process in the subscriber call processing processor checks at intervals of a certain time whether or not call register allotted to child processes that currently process calls exists, so that the transferring point of the call termination completion response message at the system for managing accounting information in a mobile switching center is determined as the time when the allotted call register does not exist.

A method for managing accounting information in an MSC according to one preferred embodiment of the present invention includes: reporting processing result of calls when receiving a system restart-up command by preventing additional call processes and normally terminating calls in progress; and performing a system restart-up procedure when the processing result of the calls is reported by all subscriber call processing processors.

Preferably, said reporting processing result of calls when receiving a system restart-up command by preventing additional call processes and normally terminating calls in progress, includes: transferring call termination messages from an operation and maintenance processor (OMP) to each subscriber call processing processor, when receiving a system restart-up command; determining whether or not child processes that currently process calls by the main process in the subscriber call processing processor that received the call termination message, inducing normal call termination according to the determining result and preventing additional call processes at the same time; and generating a call termination completion response message at the main process, determining transferring point of the call termination completion response message and transferring the call termination completion response message to the OMP.

Preferably, said performing a system restart-up procedure when the processing result of the calls is reported by all call processing processors, includes: transferring a call termination completion response message from each subscriber call processing processor to an OMP; and checking whether or not the OMP receives the call termination completion response messages from all subscriber call processing processors and performing system restart-up procedure in a case where the OMP receives the call termination completion response messages from all subscriber call processing processors.

Preferably, the main process shifts to the idle state after transferring the call termination messages to child processes.

Preferably, the main process determines whether or not child processes that currently process calls exist, so that the call termination completion response message is generated according to the determining result.

Preferably, the main process generates the call termination completion response message including information indicating that no call in progress exists in a case where no child process that currently processes a call exists.

Preferably, the main process generates the call termination completion response message including information indicating that a certain accounting information management procedure is performed in a case where child processes that currently process calls exist according to the determining result.

Preferably, the call termination completion response message includes at least one information between information indicating that no call in progress exists in the subscriber call processing processor and information indicating that a certain accounting information management procedure is performed at processes that currently process calls.

Preferably, said generating a call termination completion response message at the main process, includes: transferring the received call termination message from the main process to child processes that currently process calls; normally terminating calls in progress and generating accounting information about the calls, according to the transferred call termination message, and transferring response messages for the call termination messages to the main process; and generating call termination completion response message, including information indicating that a certain accounting information management procedure is performed, at the main process when the main process receives from all child processes response messages for the call termination messages.

Preferably, the call termination message is transferred to only one child process between a child process that processes an incoming call and a child process that processes an outgoing call if the call is a local call.

Preferably, said transferring the received call termination message from the main process to child processes that currently process calls, includes: extracting process IDs of child processes that currently process calls by retrieving call register; and transferring call termination messages to the child processes corresponding to the extracted process IDs.

Preferably, the transferring point is the time when a certain waiting time, measured from the time when the main process in the subscriber call processing processor receives the call termination message, passes.

Preferably, the main process in the subscriber call processing processor checks at intervals of a certain time whether or not call register allotted to child processes that currently process calls exists, so that the transferring point of the call termination completion response message according to the method for managing accounting information in a mobile switching center is determined as the time when the allotted call register does not exist.

Preferably, said transferring the call termination completion response message to the OMP includes: receiving response messages, including information indicating that a certain accounting information management procedure is performed, from child processes that currently process calls; and comparing the number of received response messages and the number of call termination messages transferred to the child processes and, in a case where the numbers are equal, transferring the call termination completion response message, including information indicating that a certain accounting information management procedure is performed, from the main process to the OMP.

Preferably, in a case where the number of response messages and the number of call termination messages are not equal as a result of the comparison, the main process transfers the call termination completion response message, indicating that a certain accounting information management procedure is performed, to the OMP after a certain waiting time.

DETAILED DESCRIPTION OF THE PREFERRED EMBODIMENT

Hereinafter, a detailed explanation will be given as to the preferred embodiment of the present invention with reference to the attached drawings.

The present invention relates to a preprocessing procedure, that generates and records accounting information for a lot of calls to be lost due to an abnormal termination and shifts to an idle state in order to prevent additional inputs of calls, by being performed before restart-up procedure.

Figure 1:
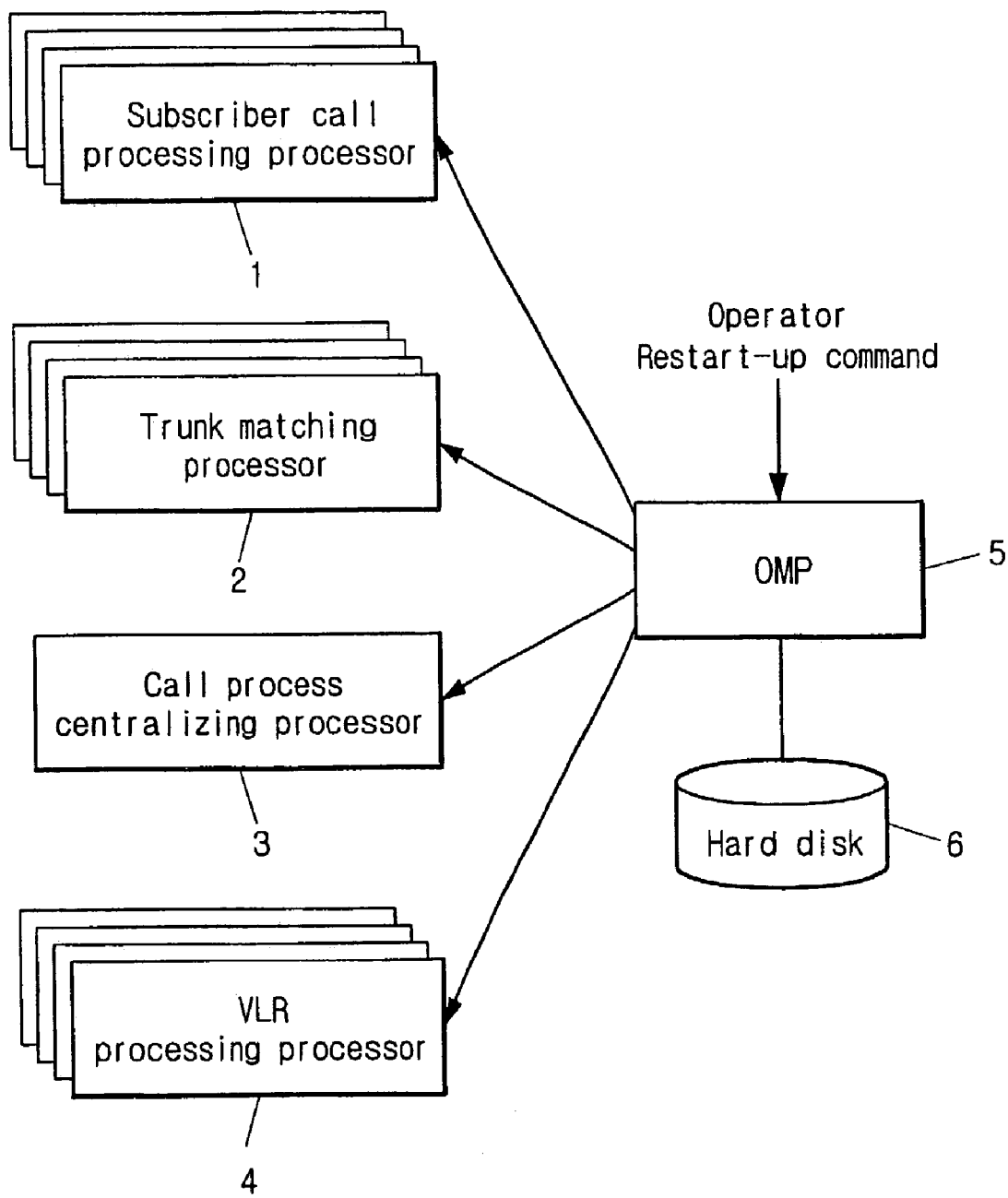
FIG. 1 illustrates the structure of an MSC to which a related art method of managing accounting information in an MSC is applied.
Figure 2:
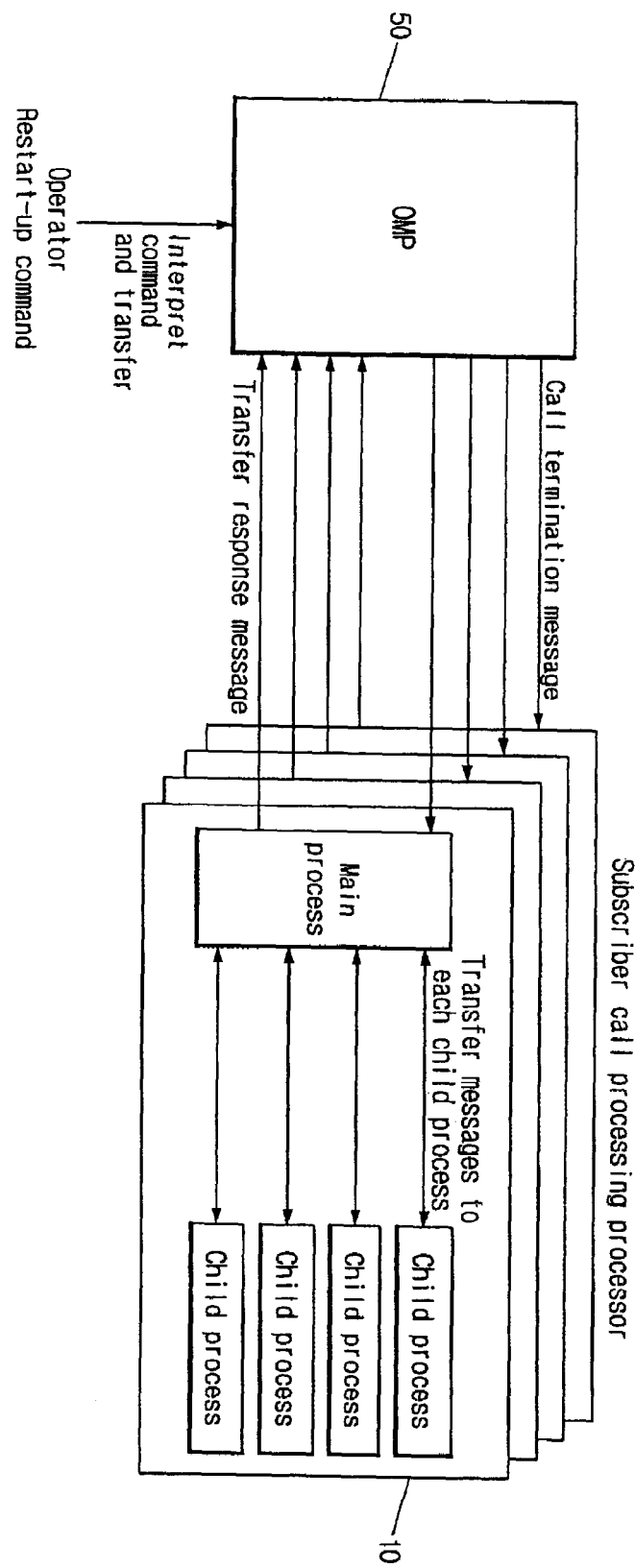
FIG. 2 illustrates a configuration of a system of managing accounting information in an MSC according to one preferred embodiment of the present invention.
Figure 3:
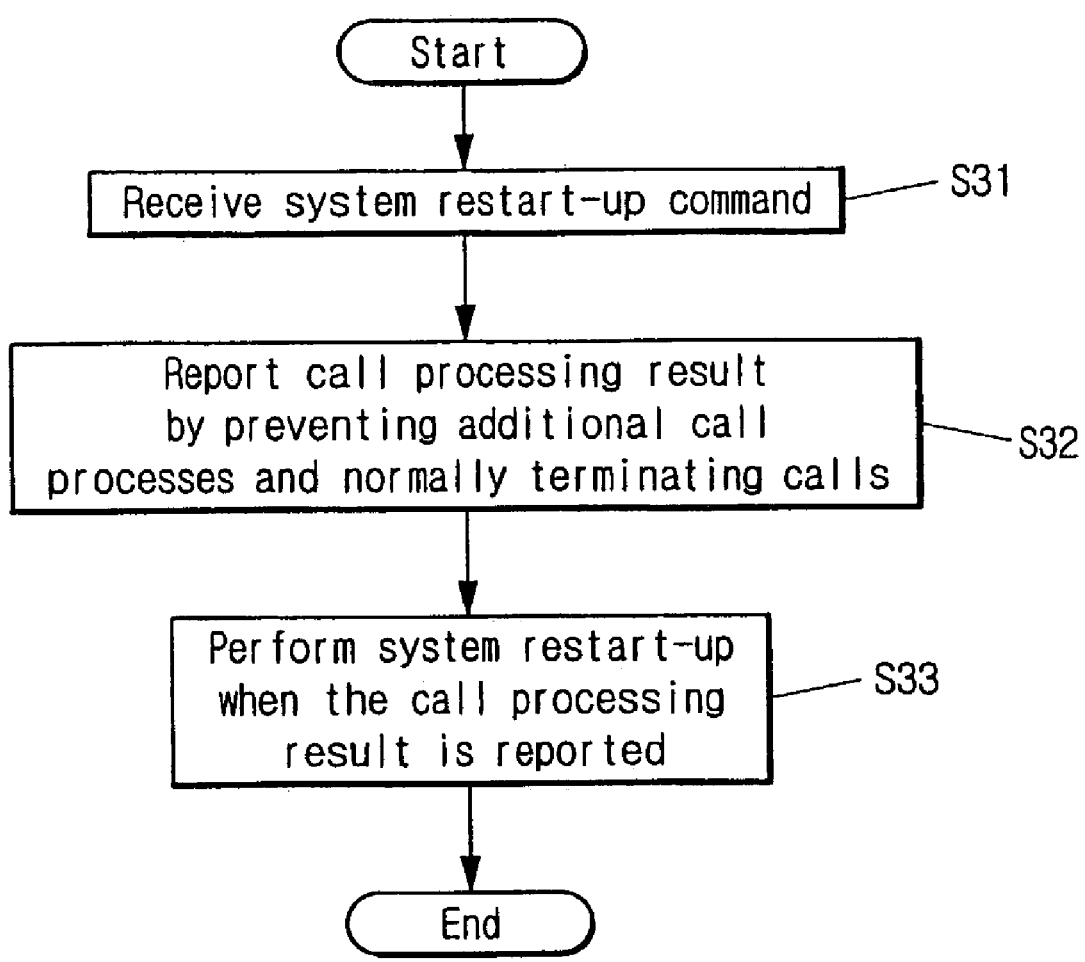
FIG. 3 is a flow chart illustrating a method of managing accounting information in an MSC according to one preferred embodiment of the present invention.

As illustrated in FIG. 2, the system according to one preferred embodiment of the present invention includes subscriber call processing processors 10 and an OMP 50. Software blocks in the processors operate the system.

The subscriber call processing processor 10 performs principal call processing functions, such as call connection, resource management, accounting information generation, etc. If the subscriber call processing processor 10 receives a system restart-up command from the OMP 50, the subscriber call processing processor transfers a call termination message to main process of the subscriber call processing processor. And, the main process transfers the call termination message to child processes.

If the main process receives response messages for the call termination messages, indicating that all calls in progress are terminated and accounting information for the calls is generated, from the child processes, the main process generates a call termination completion response message, determines transferring point of the call termination completion response message and transfers the call termination completion response message to the OMP 50.

In other words, the subscriber call processing processor 10 that received the system restart-up command from the OMP 50 prevents additional call processes, terminates calls in progress normally and reports the result of processing the calls in progress to the OMP 50 again (S31, S32).

And, the OMP 50 performs a system restart-up procedure only if all subscriber call processing processors 10 report the result of processing the calls to the OMP 50 (S33).

In other words, the OMP 50 transfers call termination messages to the subscriber call processing processors 10 if the OMP 50 receives a system restart-up command from an operator terminal. And, the OMP 50 performs accounting information management and a system restart-up procedure by receiving call termination completion response message for the call termination message from the subscriber call processing processor 10.

At this time, the subscriber call processing processor 10 always involves in all calls as at least one of outgoing/incoming side, however, the trunk matching processor involves in some calls corresponding to sort of calls.

Accordingly, the subscriber call processing processor 10 operated for all calls controls call processing program blocks and normally terminates a lot of calls in progress.

Outgoing/incoming call processing order of mobile subscriber will be explained first and operations between the OMP 50 and the subscriber call processing processor 10 according to the system restart-up method will be explained later.

If mobile subscriber outgoing call occurs, main process in a subscriber call processing processor 10 generates child processes and instantly shifts to wait state for another call.

And call register is allotted to the child processes and the child processes proceed with procedures for incoming call connection, such as translation of incoming number inputted by calling subscriber, location retrieval, etc.

If the child process receives incoming response message, the child process shifts to a busy state and stores start time for accounting. And, if calling subscriber termination message or called subscriber termination message are received, the child process returns resource and call register and generates accounting information.

The call register is a space where various information occurring during a call processing procedure is stored. The call register exists in common memory area, that is allotted at the time of requesting call and that returns at the time of terminating call, and the subscriber call processing processors 10 access the call register.

The call register stores information, such as the number of child processes, ID lists of child processes that currently process call, ID lists of idle child processes, etc.

On the other hand, if an incoming call for a mobile subscriber occurs, a message processing block performs an incoming paging by receiving an incoming call request message. And, after incoming response message is transferred from a mobile handset of the mobile subscriber, the message processing block requests a main process, a service block, to perform incoming call process.

Then, the main process generates a child process for incoming call process and shifts to a wait state. The child process stores the information in the allotted call register and proceeds with a procedure for call connection with an outgoing processor.

If call termination signal is transferred from a mobile handset of called subscriber or calling subscriber, the main process releases all resources, generates accounting information selectively corresponding to carriers, transfers the accounting information to the OMP 50 and terminates the call.

The main process receives outgoing and incoming call request in the subscriber call processing processor 10 and makes child processes proceed with call processes separately. Call processing information for separate call processing procedure (such as switch information, called subscriber numbers, calling subscriber numbers, location information, current state of call processing procedure, etc.) is recorded by child processes in call register.

Accordingly, the main process may obtain information, such as the number of child processes in the subscriber call processing processor, addresses of the child processes, current state of each call, etc., by retrieving call register, common memory area.

Figure 4:
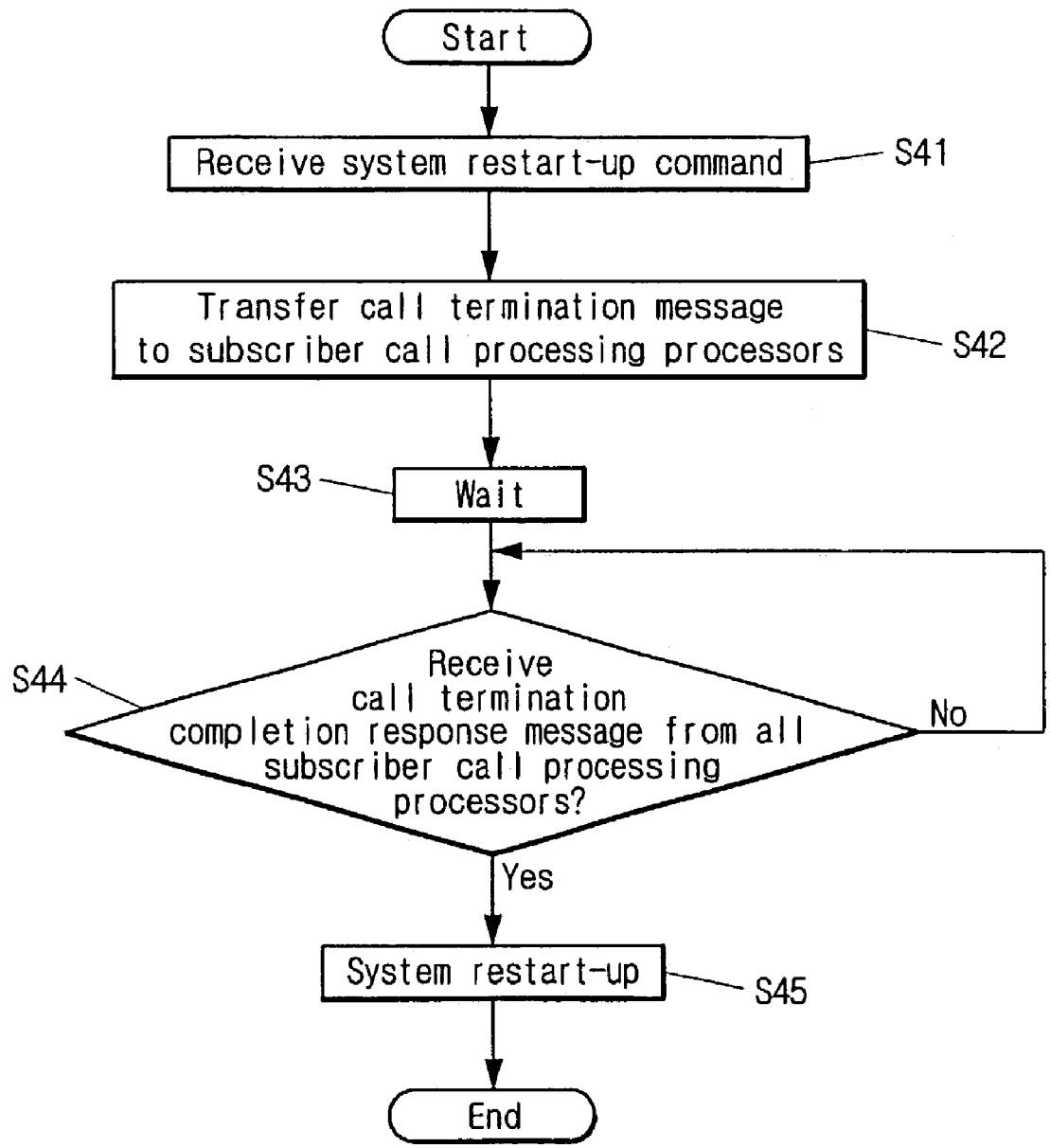
FIG. 4 is a flow chart illustrating operations of an OMP according to one preferred embodiment of the present invention.
Figure 5:
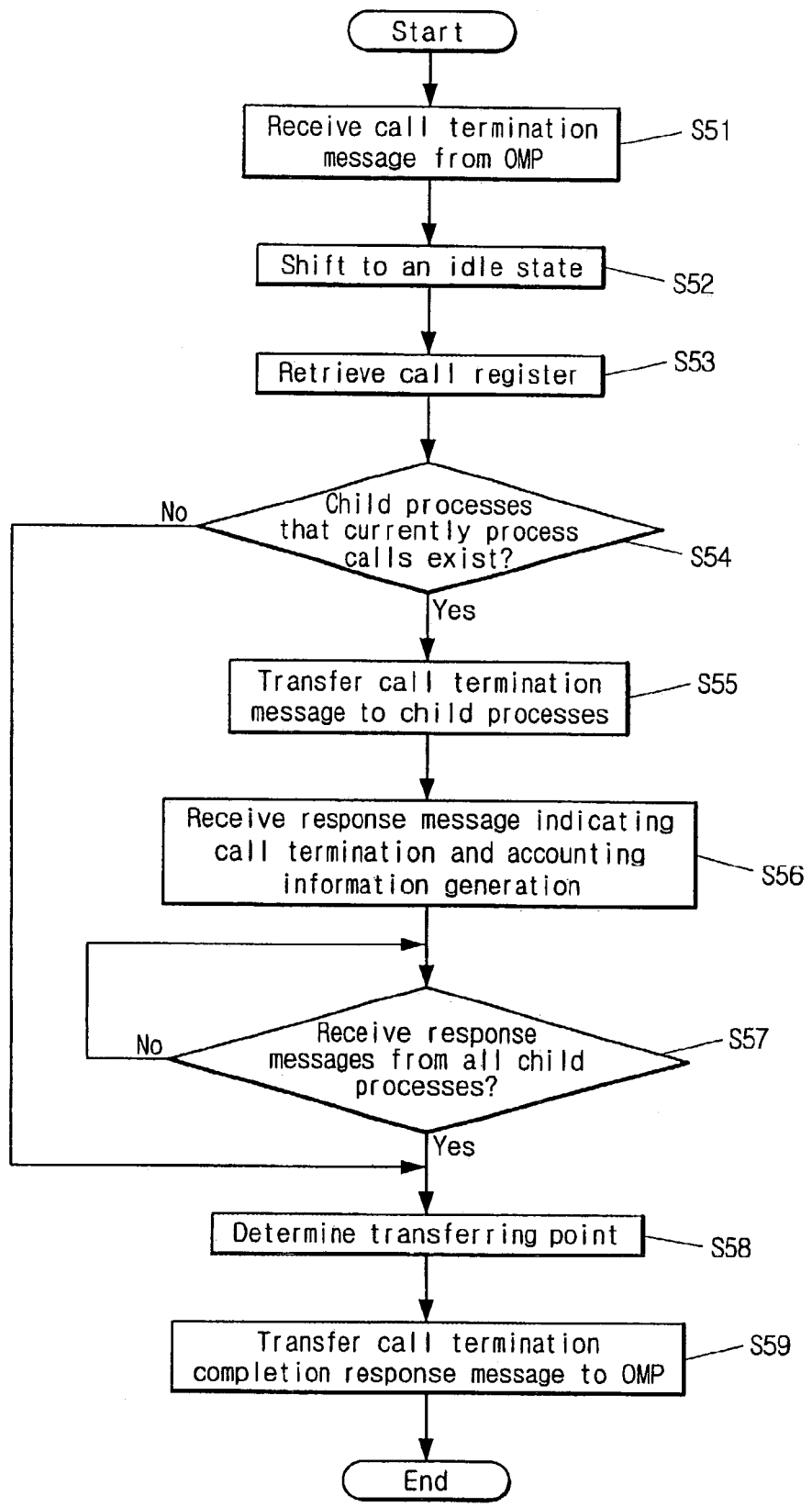
FIG. 5 is a flow chart illustrating operations of a subscriber call processing processor according to one preferred embodiment of the present invention.

FIGS. 4 and 5 illustrate method and system for managing accounting information in an MSC according to one preferred embodiment of the present invention. FIGS. 4 and 5 are flowcharts respectively illustrating operations of the OMP and the subscriber call processing processor.

The OMP 50 receives a restart-up command from an operator terminal (S41), generates call termination messages by interpreting the restart-up command and transfers the call termination messages to each subscriber call processing processor 10 (S42).

And, the OMP 50 shifts to a wait state until call termination completion response messages for the call termination messages are received from the subscriber call processing processors 10 (S43). The reason why the OMP is in the wait state is to prevent an input of another call except calls in progress.

If the call termination completion response messages are received from all of the subscriber call processing processors 10, system is restarted up (S44, S45).

On the other hand, main process in the subscriber call processing processor 10 that received call termination message from the OMP 50 shifts to a wait state (S52) and waits for responses from child processes without performing additional call processes.

The main process retrieves call register (S53) and determines whether or not child processes that currently process a call exist (S54).

In a case where a child process that currently processes a call does not exist, it means that no call in progress exists, so that main process transfers call termination completion response message, indicating that no call in progress exists, to the OMP 50 (S59).

On the other hand, in a case where child processes that currently process calls exist as a result of retrieving the call register, the main process extracts process IDs of child processes that currently process calls from the call register and transfers call termination messages to child processes corresponding to the extracted process IDs (S55).

Since a process ID of child process is needed for transferring the message to the child process, the main process transfers a call termination message to the child process by searching a call register for a destination process ID.

And the child process terminates a call in progress after receiving the call termination message, generates accounting information and generates response message for the call termination message. The main process that shifted to an idle state receives the response message (S56).

The main process determines whether response message for the call termination message is received from all child processes (S57). In a case where the response messages are received from all child processes, the main process generates a call termination completion response message including information indicating that a certain accounting information management procedure is performed, determines transferring point of the call termination completion response message and transfers the call termination completion response message to the OMP 50 (S58, S59).

The main process may determine the transferring point of the call termination completion response message indicating that certain accounting information management procedure is performed according to various methods. There are methods of determining the transferring point of the call termination completion response message, such as a method of transferring call termination completion response message if a certain waiting time passes from the time when the main process receives the call termination message and a method of transferring the call termination completion response message at the time when the allotted call register does not exist as a result of checking at intervals of a certain time whether call register allotted to a child process, that currently processes a call, exists.

The certain waiting time is determined by experimentally calculating time generally taken to perform a certain accounting information management procedure at all child processes and the intervals of the certain time is determined by considering time generally taken to perform a certain accounting information management procedure at all child processes.

Accounting information that occurs when a call is normally terminated after each child process receives a call termination message is also transferred to accounting processing blocks of OMP 50, thereby storing records about terminated calls.

The OMP 50 in a wait state checks whether call termination completion response messages are received from all subscriber call processing processors 10 (S44). In a case where the call termination completion response messages are received from all subscriber call processing processors 10, system is restarted-up (S45).

Figure 6:
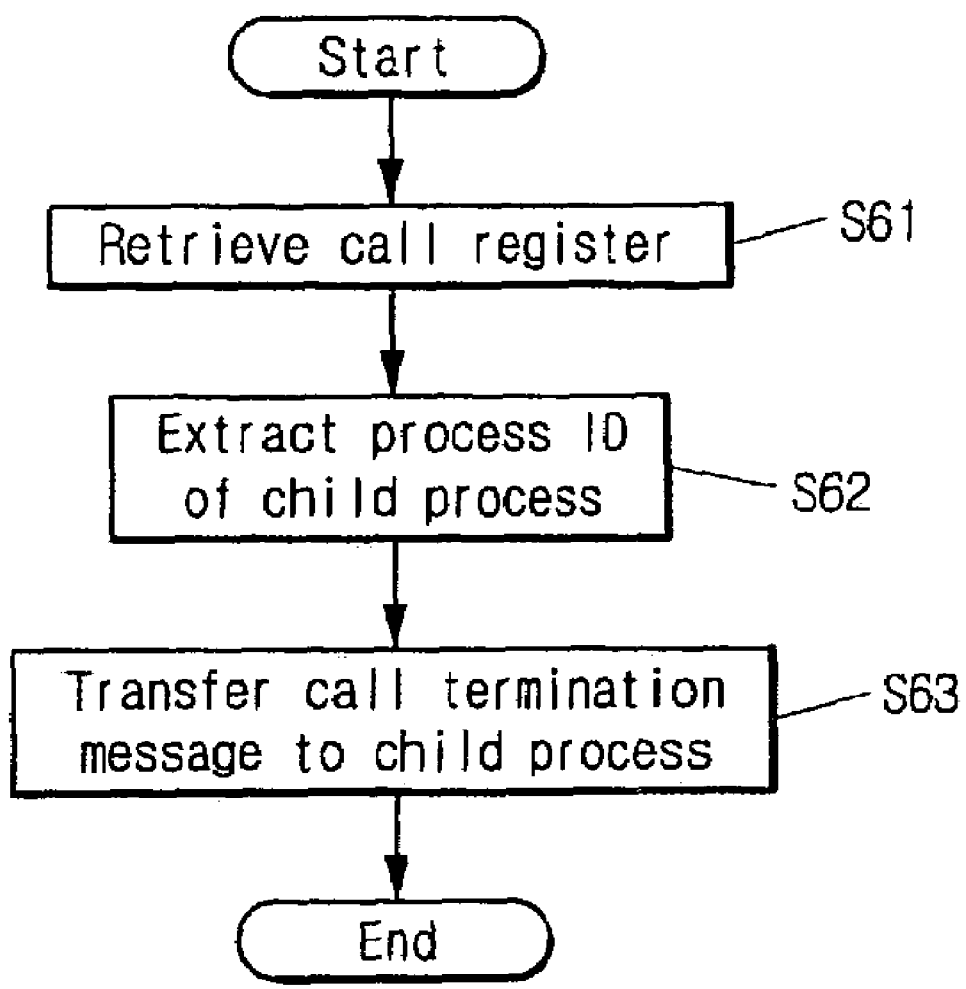
FIG. 6 is a flow chart illustrating a process of transferring call termination message to child processes according to one preferred embodiment of the present invention.
Figure 7:
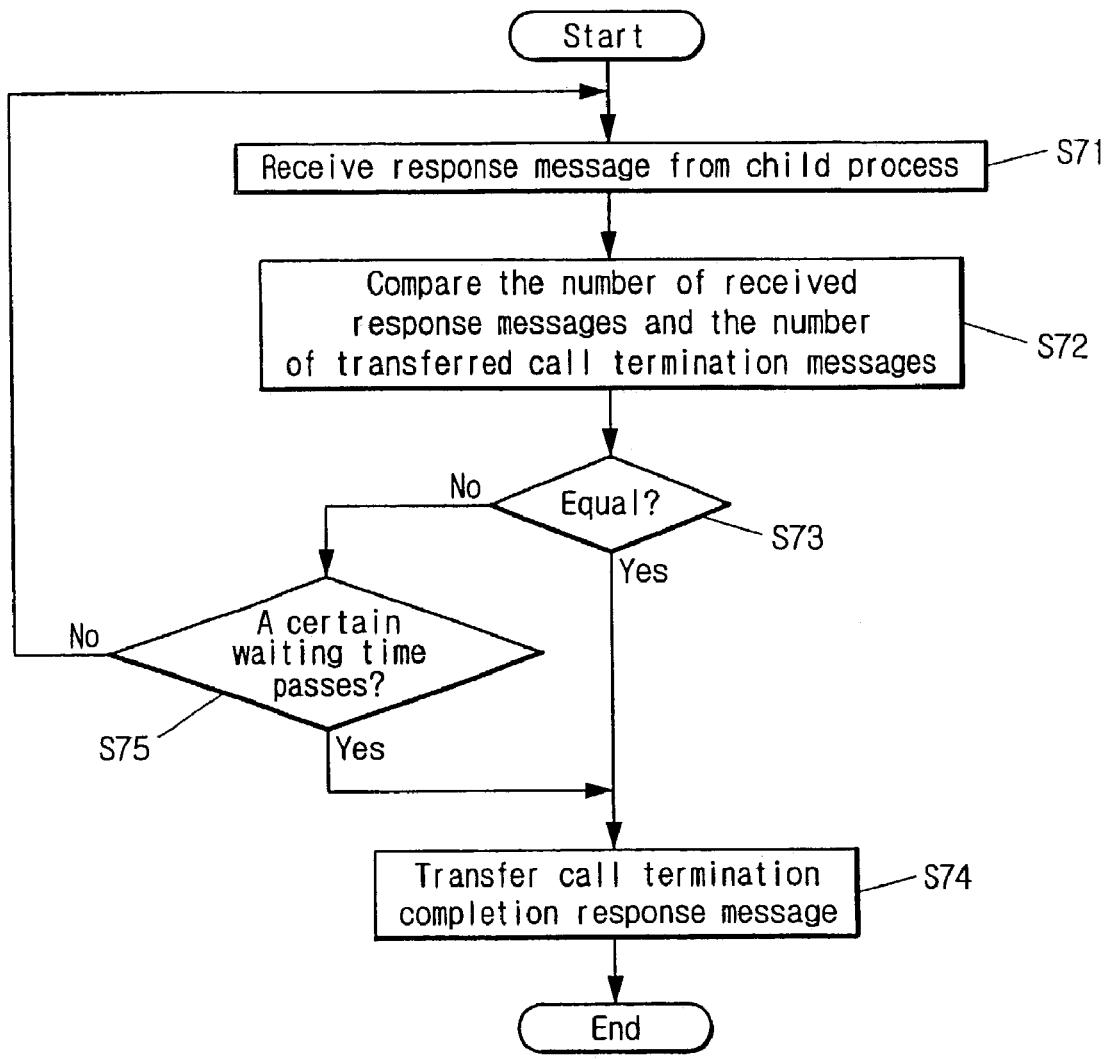
FIG. 7 is a flow chart illustrating a process of transferring call termination completion response message according to one preferred embodiment of the present invention.

Hereinafter, a detailed explanation as to operations of transferring messages between the main process and child processes will be given with reference to FIGS. 6 and 7.

The main process in the subscriber call processing processor 10 that received the call termination message from the OMP 50 retrieves the call register (S61), extracts process IDs of child processes that currently process calls (S62) and transfers call termination messages to the child processes (S63).

The main process may retrieve type of calls through call register information. Since a child process that process an incoming call and a child process that process an outgoing call exist in the subscriber call processing processor 10 if the call is a local call, the call termination message is transferred only to the child process that processes the outgoing call in order to avoid duplication.

The main process that received response messages for the call termination messages from the child processes compares the number of received response messages and the number of call termination messages transferred to the child processes (S71, S72).

As the result of the comparison, in a case where the number of response messages and the number of call termination messages are equal, it is determined that all child processes are normally terminated, so that the main process generates a call termination completion response message, indicating that a certain accounting information management procedure is performed, and transfers the call termination completion response message to the OMP 50 (S73, S74)

In contrast, in a case where the number of response messages and the number of call termination messages are not equal as a result of the comparison, the main process transfers a call termination completion response message, indicating that a certain accounting information management procedure is performed, to the OMP 50 after a certain waiting time (S75).

The main process performs the above process (S71~S73) repeatedly whenever the main process receives response messages for call termination messages from the child processes during the certain waiting time.

The main process waits the certain waiting time in order to receive response messages for call termination messages from the child processes and the main process forcefully terminates calls, that are not normally completed yet, by transferring a final call termination completion response message after the certain waiting time. The waiting time is determined by experimentally calculating time generally taken to transfer response messages for call termination messages at child process.

As above described, since call processing procedures are progressed at the same time in various states (for example, calls in busy state are served for lots of subscribers, procedures for providing call connection are in progress or call termination procedure is performed after call completion) in a mobile switching system, the related art method of forcefully restarting up system causes loss of accounting information, important information for both carriers and subscribers, for a lot of calls forcefully terminated. The method and system for managing accounting information in a mobile switching center of the present invention stores a large amount of information in danger of losing as accounting information and prevents additional call processing procedures, thereby performing by transferring messages not abnormal terminating procedures for all calls in progress but normal terminating procedures. Accordingly, the method and system for managing accounting information in a mobile switching center of the present invention may appropriately release resources and minimize abnormal termination. Further, the method and system for managing accounting information in mobile switching center of the present invention may be effectively applied to applications of application software corresponding to additional developments of various services and improvements of problems in operation.

Also, the foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications and variations will be apparent to those skilled in the art.

What is claimed is:

1. A system for managing accounting information in a mobile switching center (MSC), comprising:
    an operation and maintenance processor (OMP) configured to terminate calls in progress normally by controlling each subscriber call processing processor when receiving a system restart-up command and to perform system restart-up procedure when receiving a call termination completion response message; and
    a number of subscriber call processing processors configured to prevent additional call processes, to terminate calls in progress normally and to report processing result of the calls to the OMP, by control of the OMP, wherein the subscriber call processing processor generates the call termination completion response message, determines a transferring point of the call termination completion response message and reports the processing result of the calls, and
    wherein a main process in the subscriber call processing processor checks at intervals of a certain time whether or not call register allotted to child processes that currently process calls exists.

2. The system of claim 1, wherein the subscriber call processing processor shifts to the wait state after receiving a call termination message.

3. The system of claim 1, wherein the termination completion response message includes information indicating that no call is in progress in the subscriber call processing processor.

4. The system of claim 1, wherein the termination completion response message includes information indicating that a certain accounting information management procedure is performed by processes that currently process calls.

5. The system of claim 1, wherein the transferring point of the call termination completion response message is a time when a certain waiting time, measured from a time when the main process in the subscriber call processing processor receives the call termination message, passes.

6. The system of claim 1, wherein the transferring point of the call termination completion response message is determined as a time when the allotted call register does not exist.

7. A method for managing accounting information in an MSC, comprising:
    reporting processing result of calls when receiving a system restart-up command by preventing additional call processes and normally terminating calls in progress; and
    performing a system restart-up procedure when the processing result of the calls is reported by all subscriber call processing processors, wherein said reporting comprises:
    transferring one or more call termination messages from an operation and maintenance processor (OMP) to each subscriber call processing processor, when receiving a system restart-up command;
    determining whether or not child processes exist that currently process calls by a main process in the subscriber call processing processor that received the call termination message, inducing normal call termination according to the determining result and preventing additional call processes at the same time; and
    generating a call termination completion response message at the main process, determining a transferring point of the call termination completion response message and transferring the call termination completion response message to the OMP.

8. The method of claim 7, wherein the main process shifts to the idle state after transferring the call termination messages to child processes.

9. The method of claim 7, wherein the call termination completion response message includes at least one information between information indicating that no call in progress exists in the subscriber call processing processor and information indicating that a certain accounting information management procedure is performed at processes that currently process calls.

10. The method of claim 7, wherein the transferring point is a time when a certain waiting time, measured from a time when the main process in the subscriber call processing processor receives the call termination message, passes.

11. The method of claim 7, wherein the main process in the subscriber call processing processor checks at intervals of a certain time whether or not call register allotted to child processes that currently process calls exists and the transferring point of the call termination completion response message is determined as a time when the allotted call register does not exist.

12. The method of claim 7, wherein said performing a system restart-up procedure when the processing result of the calls is reported by all call processing processors, comprises:
   transferring a call termination completion response message from each subscriber call processing processor to an OMP; and
   checking whether or not the OMP receives the call termination completion response messages from all subscriber call processing processors and performing the system restart-up procedure in a case where the OMP receives the call termination completion response messages from all subscriber call processing processors.

13. The method of claim 12, wherein the call termination completion response message includes at least one information between information indicating that no call in progress exists in the subscriber call processing processor and information indicating that a certain accounting information management procedure is performed at processes that currently process calls.

14. The method of claim 7, wherein the main process determines whether or not child processes that currently process calls exist and the call termination completion response message is generated according to the determining result.

15. The method of claim 14, wherein the main process generates the call termination completion response message including information indicating that no call in progress exists in a case where no child process that currently processes a call exists.

16. The method of claim 14, wherein the main process generates the call termination completion response message including information indicating that a certain accounting information management procedure is performed in a case where child processes that currently process calls exist according to the determining result.

17. The method of claim 7, wherein said generating a call termination completion response message at the main process, comprises:
   transferring the received call termination message from the main process to child processes that currently process calls;
   normally terminating calls in progress and generating accounting information about the calls, according to the transferred call termination message, and transferring response messages for the call termination messages to the main process; and
   generating call termination completion response message, including information indicating that a certain accounting information management procedure is performed, at the main process when the main process receives from all child processes response messages for the call termination messages.

18. The method of claim 17, wherein the call termination message is transferred to Only one child process between a child process that processes an incoming call and a child process that processes an outgoing call if the call is a local call.

19. The method of claim 17, wherein said transferring the received call termination message from the main process to child processes that currently process calls, comprises:
   extracting process IDs of child processes that currently process calls by retrieving call register; and
   transferring call termination messages to the child processes corresponding to the extracted process IDs.

20. The method of claim 7, wherein said transferring the call termination completion response message to the OMP, comprises:
   receiving response messages, including information indicating that a certain accounting information management procedure is performed, from child processes that currently process calls: and
   comparing the number of received response messages and the number of call termination messages transferred to the child processes and, in a case where the numbers are equal, transferring the call termination completion response message, including information indicating that a certain accounting information management procedure is performed, from the main process to the OMP.

21. The method of claim 20, wherein, in a case where the number of response messages and the number of call termination messages are not equal as a result of the comparison, the main process transfers the call termination completion response message, indicating that a certain accounting information management procedure is performed, to the OMP after a certain waiting time.

* * * * *